(12) United States Patent
Takagi et al.

(10) Patent No.: US 6,342,026 B1
(45) Date of Patent: Jan. 29, 2002

(54) AUTOMATIC TRANSMISSION FOR VEHICLES

(75) Inventors: Kiyoharu Takagi; Yoshiyuki Onimaru, both of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/629,888

(22) Filed: Jul. 31, 2000

(30) Foreign Application Priority Data

Jul. 29, 1999 (JP) .......................................... 11-215566

(51) Int. Cl.[7] ................................................. F16H 3/62
(52) U.S. Cl. ........................ 475/276; 475/280; 475/286
(58) Field of Search ................................ 475/276, 280, 475/286

(56) References Cited

U.S. PATENT DOCUMENTS

| | | | |
|---|---|---|---|
| 4,038,888 A | * 8/1977 | Murakami et al. | 475/276 |
| 4,070,927 A | 1/1978 | Polak | 475/286 |
| 5,928,102 A | * 7/1999 | Park | 475/280 |
| 6,176,803 B1 | * 1/2001 | Meyer et al. | 475/286 |

FOREIGN PATENT DOCUMENTS

| | | |
|---|---|---|
| JP | 52-149562 | 12/1977 |
| JP | 2-129446 | 5/1990 |

* cited by examiner

*Primary Examiner*—Sherry Estremsky
(74) *Attorney, Agent, or Firm*—Burns, Doane, Swecker & Mathis, LLP

(57) ABSTRACT

An automatic transmission is capable of obtaining appropriate gear ratios for six forward shifts and one reverse shift. The automatic transmission includes a first planetary gear, a second planetary gear, a planetary gear unit including a third planetary gear, and a fourth planetary gear. Also provided are first, second, third and fourth shaft elements, first and second first clutch elements, first, second, and third brake elements, the first clutch element is capable of selectively interconnecting the input shaft and the fourth shaft element. The second clutch element is capable of selectively interconnecting the input shaft and the carrier of the single planetary gear. The first brake element is capable of selectively fixing the first shaft element. The second brake element is capable of selectively fixing the second shaft element. The third brake element is capable of selectively fixing either the sun gear or the carrier of the double pinion planetary gear.

3 Claims, 4 Drawing Sheets

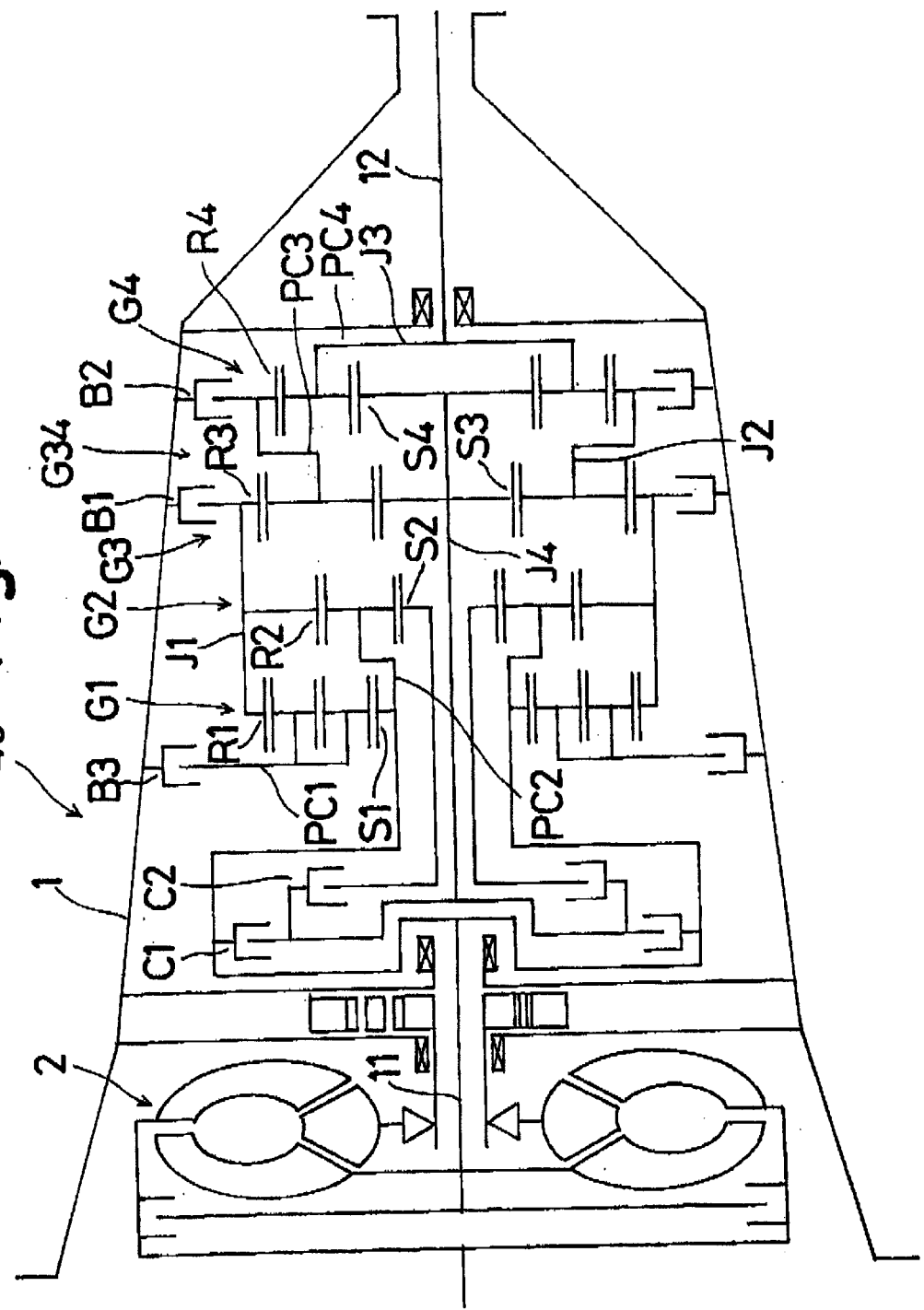

AUTOMATIC TRANSMISSION FOR VEHICLES

FIELD OF THE INVENTION

This invention relates to an automatic transmission and, more particularly, to an automatic transmission which provides appropriate gear ratios for each gear shift applied to vehicles.

DESCRIPTION OF THE RELATED ARTS

As a prior art, an automatic transmission is disclosed in a Japan Patent Laid-open Publication 52-149562 (published on Dec. 12, 1977). This prior art discloses an automatic transmission in which three lines of planetary gears having a ring gear, a carrier, and a sun gear are disposed in series. The automatic transmission is capable of switching in six forward shifts and one reverse shift with five frictional engaging elements including two clutch elements and three brake elements actuated by an outer force.

However, with the structure of the automatic transmission employed in the above mentioned prior art, the gear ratio for a reverse shift becomes large when setting up the optimum gear ratio step for forward gears. When enlarging the gear ratio of the second forward speed, the gear ratio of the fifth forward speed is undesirably reduced. When reducing the gear ratio of the second forward speed, other problems are caused, e.g., the gear ratio of the fifth forward speed is enlarged, but the shifting from fifth forward speed to the sixth forward speed becomes undesirable and the pinion rpm at the sixth forward speed is increased.

SUMMARY OF THE INVENTION

Accordingly, an object of this invention is to provide an automatic transmission capable of obtaining the appropriate gear ratio with six forward shifts and one reverse shift.

To solve the foregoing problems, the automatic transmission of this invention is provided with the following technical features which include: an input shaft, an output shaft, a double pinion planetary gear in the first line, of which one of a sun gear or a carrier is connected to the input shaft; a single planetary gear in the second line, of which a ring gear is connected or is selectively connectable to a ring gear of the double pinion planetary gear in the first line; a planetary gear unit provided in series including a single planetary gear in a third line, of which a ring gear is connected to the ring gear of the double pinion planetary gear in the first line; a single planetary gear in the fourth line, of which a ring gear is connected to a carrier of the single planetary gear in the third line and of which a sun gear is connected to a sun gear of the single planetary gear in the third line; a first shaft element connected to the ring gear of the single planetary gear in the third line; a second shaft element connected to the carrier of the single planetary gear in the third line; a third shaft element connected to a carrier of the single planetary gear in the fourth line and to the output shaft; and a fourth shaft element connected to the sun gear of the single planetary gear in the third line. A first clutch element C1 is capable of selectively connecting the input shaft and the fourth shaft element of the planetary gear unit. A second clutch element C2 is capable of connecting the input shaft and the carrier of the single planetary gear in the second line. A first brake element B1 is capable of selectively fixing the first shaft element of the planetary gear unit, and a second brake element B2 is capable of selectively fixing the second shaft element of the planetary gear unit. A third brake element B3 is capable of selectively fixing the sun gear or the other carrier of the double pinion planetary gear in the first line.

Another feature of the automatic transmission of this invention involves the second clutch element being capable of selectively interconnecting the first shaft element and the ring gear of the single planetary gear in the second line by normally interconnecting the input shaft and the carrier of the single planetary gear in the second line instead of the second clutch element which is capable of selectively connecting the input shaft and the carrier of the single planetary gear in the second line.

A further feature of the automatic transmission of this invention involves the second clutch element being capable of selectively interconnecting the fourth shaft element and the sun gear of the single planetary gear in the second line by normally interconnecting the input shaft and the carrier of the single planetary gear in the second line instead of the second clutch element which is capable of selectively connecting the input shaft and the carrier of the single planetary gear in the second line.

The automatic transmission enables six speed forward shifts and one reverse shift to be established by switching the combinations of five frictional engagement elements including the first clutch element C1, the second clutch element C2, the first brake element B1, the second brake element B2, and the third brake element B3. Since the ratio of the number of the teeth between the ring gear and the sun gear of the planetary gear in the first line depends on the size of the gear ratio of the planetary gear in the first line being fixed, the gear ratio of the forwarding shifts and the reverse shift is modified to the appropriate gear ratio by adopting the double pinion planetary gear for the planetary gear in the first line. In addition, by adding the single planetary gear in the second line, the gear ratio which is not modified by the double pinion planetary gear in the first line is set appropriately. The automatic transmission having the features explained above can provide appropriate gear ratios for each shift of six forward and one reverse shifts.

BRIEF DESCRIPTION OF THE DRAWINGS

These and other objects of the invention will be more apparent and more readily appreciated form the following detailed description of the preferred embodiment of the invention with the accompanying drawings, in which;

FIG. 4 is a schematic view of a fourth embodiment of the automatic transmission.

DETAILED DESCRIPTION OF PREFERRED EMBODIMENTS OF THE INVENTION

Figure 1:
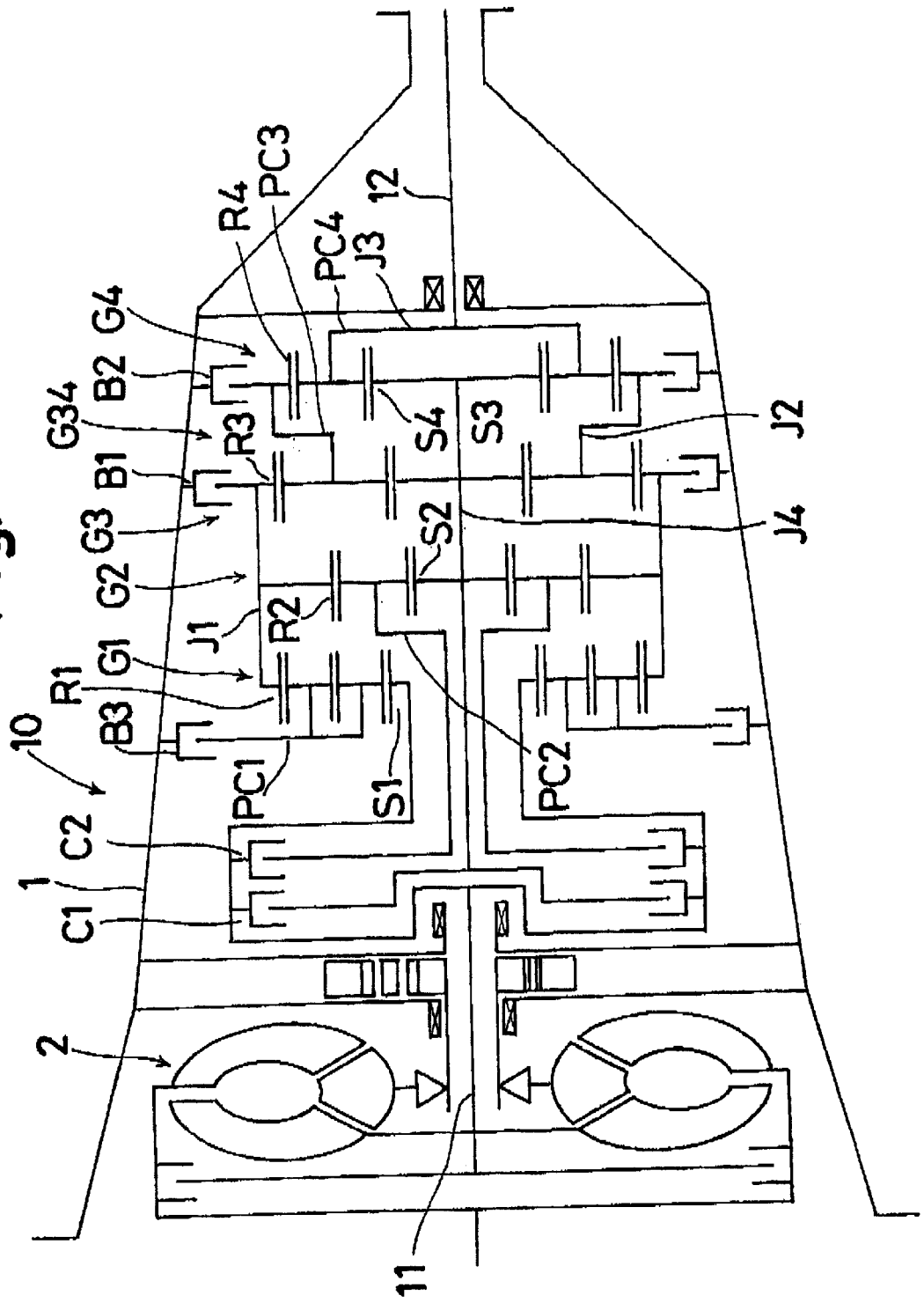
FIG. 1 is a schematic view of a first embodiment of an automatic transmission.

The embodiments of an automatic transmission of this invention will be described as follows referring to FIGS. 1 through 4. FIG. 1 shows a torque converter which transmits an output of an engine (not shown), and a gear train of an automatic transmission 10 of a first embodiment. The automatic transmission 10, disposed in a housing 1, transmits an output from the torque converter 2, via a shearing force of a viscous fluid to a wheel axle (not shown) and exhibits six forward shifts and one reverse shift in accordance with frictional engagement elements.

The automatic transmission 10 comprises a double planetary gear G1 of a first line (a first planetary gear G1), a single planetary gear G2 in a second line (a second planetary gear G2), and a planetary gear unit G34 comprising a single planetary gear G3 of a third line (a third planetary gear G3). The planetary gear G3 includes a ring gear R3 connected to the ring gear R1 of the first planetary gear G1. The transmission 10 further comprises a single planetary gear G4 in a fourth line (a fourth planetary gear G4) which includes a ring gear R4 connected to a carrier PC3 of the third planetary gear G3. The ring gear R4 is associated with a sun gear S4 that is connected to a sun gear S3 of the third planetary gear G3. The transmission 10 further comprises a first shaft element J1 connected to the ring gear R3 of the third planetary gear G3, a second shaft element J2 connected to the carrier PC3 of the third planetary gear G3, a third shaft element J3 connected to a carrier PC4 of the fourth planetary gear G4 and to the output shaft 12, and a fourth shaft element J4 connected to the sun gear S3 of the third planetary gear G3. A first clutch element C1 is capable of selectively interconnecting an input shaft 11 and a fourth shaft element J4, and a second clutch element C2 is capable of selectively interconnecting the input shaft 11 and a carrier PC2 of the second planetary gear G2. A first brake element B1 is capable of selectively fixing a first shaft element J1; a second brake element is capable of selectively fixing a second shaft element J2; and a third brake element B3 is capable of selectively fixing a carrier PC1 of a first planetary gear G1.

The input shaft 11 is an output shaft of the torque converter 2. The automatic transmission 10 further includes an output shaft 12 connected to the wheel axle via a differential gearing (not shown). The first planetary gear G1 includes a sun gear S1 connected to the input shaft 11. The second planetary gear G2 includes a ring gear R2 connected to the ring gear R1 of the first planetary gear G1. The third planetary gear G3 includes the ring gear R3 connected to the ring gear R1 of the first planetary gear G1. The fourth planetary gear G4 includes the ring gear R4 connected to a carrier PC3 of the third planetary gear G3, and a sun gear S4 connected to a sun gear S3 of the third planetary gear G3. The first shaft element J1 is connected to the ring gear R3 of the third planetary gear G3. The second shaft element J2 is connected to the carrier PC3 of the third planetary gear G3. The third shaft element J3 is connected to a carrier PC4 of the fourth planetary gear G4 and also connected to the output shaft 12. The fourth shaft element J4 is connected to the sun gear S3 of the third planetary gear G3.

The following numerical values are set for each planetary gear. For the first planetary gear G1, $\rho1$=the ratio of the number of teeth of the sun gear S1 to the number of teeth of ring gear R1=0.444. For the second planetary gear G2, $\rho2$=the ratio of the number of teeth of the sun gear S2 to the number of teeth of the ring gear R2=0.4. For the third planetary gear G3, $\rho3$=the ratio of the number of the teeth of the sun gear S3 to the number of the teeth of the ring gear R3=0.28. For the fourth planetary gear G4, $\rho4$=the ratio of the number of the teeth of the sun gear S4 to the number of the teeth of the ring gear R4=0.34.

Table 1 shows combinations of each frictional engagement element and gear ratio of a first embodiment of this invention.

TABLE 1

| | C1 | C2 | B1 | B2 | B3 | Gear Ratio | Gear Ratio Step |
|---|---|---|---|---|---|---|---|
| First Speed | ○ | | | ○ | | 3.941 | 1.643 |
| Second Speed | ○ | | ○ | | | 2.398 | 1.620 |
| Third Speed | ○ | | | | ○ | 1.480 | 1.480 |
| Fourth Speed | ○ | ○ | | | | 1.000 | 1.255 |
| Fifth Speed | | ○ | | | ○ | 0.797 | 1.164 |
| Sixth Speed | | ○ | ○ | | | 0.685 | |
| Reverse | | | | ○ | ○ | 2.485 | |

*○ shows engagement
**Blank shows disengagement

The First Speed:

The shift of transmission according to Table 1 will be explained as follows. A torque of the input shaft 11 is transmitted to the fourth shaft element J4 via the first clutch element C1. Rotation of the second shaft element J2 is stopped by the second brake element B2, which leads to a reduced speed of the third shaft element J3, and the first speed is thereby formed.

The Second Speed:

The torque of the input shaft 11 is transmitted to the fourth shaft element J4 via the first clutch element C1. The rotation of the first shaft element J1 is terminated by the engagement of the first brake element B1, which leads to a reduced speed of the third shaft element J3, and the second speed is thereby formed.

The Third Speed:

The torque of input shaft 11 is transmitted to the fourth shaft element J4 via the first clutch element C1. The output of the ring gear R1 which is related to an increased torque of the input shaft 11, is transmitted to the first shaft element J1 by fixing the carrier PC1 of the first planetary gear G1 by the third brake element B3, which leads to a reduced speed of the third shaft element J3, and the third speed is thereby formed.

The Fourth Speed:

The torque of the input shaft 11 is transmitted to the fourth shaft element J4 via the first clutch element C1. The planetary gear unit G34 rotates as a unit by transmitting the torque of the input shaft 11 to the carrier PC2 of the second planetary gear G2 via the second clutch element C2, and the fourth speed is thereby formed.

The Fifth Speed:

The torque of the input shaft 11 is transmitted to the carrier PC2 of the second planetary gear G2 via the second clutch element C2. The output of the ring gear R1 which is related to an increased torque of the input shaft 11, is transmitted to the first shaft element J1 by fixing the carrier PC1 of the first planetary gear G1 by the third brake element B3, which leads to an increase in the speed of the third shaft element J3, and the fifth speed, which is an overdrive, is thereby formed.

The Sixth Speed:

The torque of the input shaft 11 is transmitted to the carrier PC2 of the second planetary gear G2 via the second clutch element C2. The termination of the rotation of the first shaft element J1 by the first brake element B1 leads to an increase in the speed of the third shaft element J3, and the sixth speed, which is another overdrive, is thereby formed.

The Reverse Shift:

The output of the ring gear R1, which is related to an increased torque of the input shaft 11, is inputted into the first shaft element J1 by fixing the carrier PC1 of the first planetary gear G1 by the third brake element B3. The third shaft element J3 is rotated in reverse by terminating the rotation of the second shaft element J2 by the second brake element B2, and the reverse shift thereby is formed.

As mentioned above, by changing the combination of five frictional engagement elements, C1, C2, B1, B2, and B3, the transmission 10 obtains six forward speed shifts including four under-drives and two over-drives and one reverse shift.

Figure 2:
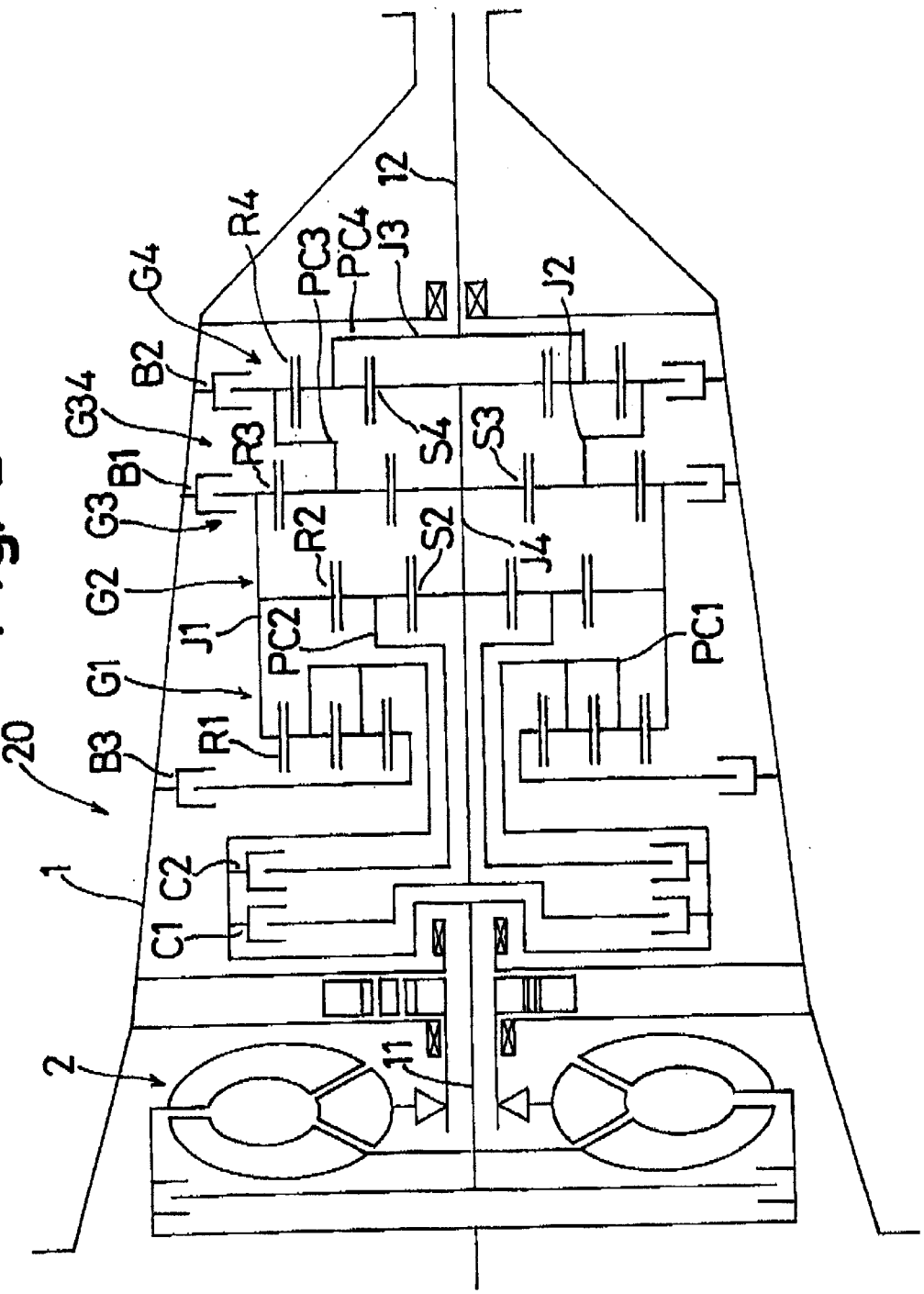
FIG. 2 is a schematic view of a second embodiment of the automatic transmission.

An automatic transmission 20 of a second embodiment of this invention will be explained as follows. FIG. 2 shows a gear train of the automatic transmission 20 of the second embodiment.

The automatic transmission 20 of the second embodiment has the following differences compared to the above-mentioned automatic transmission 10 of the first embodiment. In the second embodiment, the input shaft 11 is connected to the carrier PC1 instead of to the sun gear S1, and the third brake element B3 is capable of selectively fixing the sun gear S1. Since the other structures of the second embodiment are identical to the first embodiment, further explanation thereof will be omitted and the same reference numerals will be provided.

For the second embodiment, the following numerical values are set.

For the first planetary gear G1, $\rho 1$=the ratio of the number of the teeth of the sun gear S1 to the number of the teeth of the ring gear R1=0.556. For the second planetary gear G2, $\rho 2$=the ratio of the number of the teeth of the sun gear S2 to the number of the teeth of the ring gear R2=0.4. For the third planetary gear G3, $\rho 3$=the ratio of the number of the teeth of the sun gear to the number of the gear of the ring gear R3=0.28. For the fourth planetary gear G4, $\rho 4$=the ratio of the number of the teeth of the sun gear S4 to the number of the teeth of the ring gear R4=0.34.

Since the combinations of each frictional engagement element and the gear ratios in the second embodiment are identical to the combinations of each frictional engagement element and the gear ratios of the first embodiment, a table showing the combinations and the gear ratios of the second embodiment will be omitted. The operation at switching each frictional engagement element at the first speed, the second speed, the fourth speed, and the sixth speed is identical to the first embodiment, so further explanation will be omitted. The operation of the switching for the third speed, the fifth speed, and the reverse shift will be explained hereinafter.

The Third Speed:

The torque of the input shaft 11 is transmitted to the fourth shaft element J4 via the first clutch element C1. The output of the ring gear R1, which is related to the increased torque of the input shaft 11, is inputted into the first shaft element J1 by fixing the sun gear S1 of the first planetary gear G1 by the third brake element B3, which leads to a reduced speed of the third shaft element J3, and the third speed is thereby formed.

The Fourth Speed:

The torque of the input shaft 11 is transmitted to the carrier PC2 of the second planetary gear G2 via the second clutch element C2. The output of the ring gear R1, which is related to an increased torque of the input shaft 11, is transmitted to the first shaft element J1 by fixing the sun gear S1 of the first planetary gear G1 by the third brake element B3, which leads to an increase in speed of the third shaft element J3, and the fifth speed, which is an overdrive, is thereby formed.

The Reverse Shift:

The output of the ring gear R1 which is related to an increased torque of the input shaft 11, is inputted into the first shaft element J1 by fixing the sun gear S1 of the first planetary gear G1 by the third brake element B3. The third shaft element J3 is rotated in reverse by terminating the rotation of the second shaft element J2 by the second brake element B2, and the reverse shift is thereby formed.

As explained in the forgoing section, by changing the combination of frictional engagement elements of the transmission 20, C1, C2, B1, B2, and B3, the transmission 20 obtains six forward speed shifts including four underdrives and two overdrives and one reverse shift.

Figure 3:
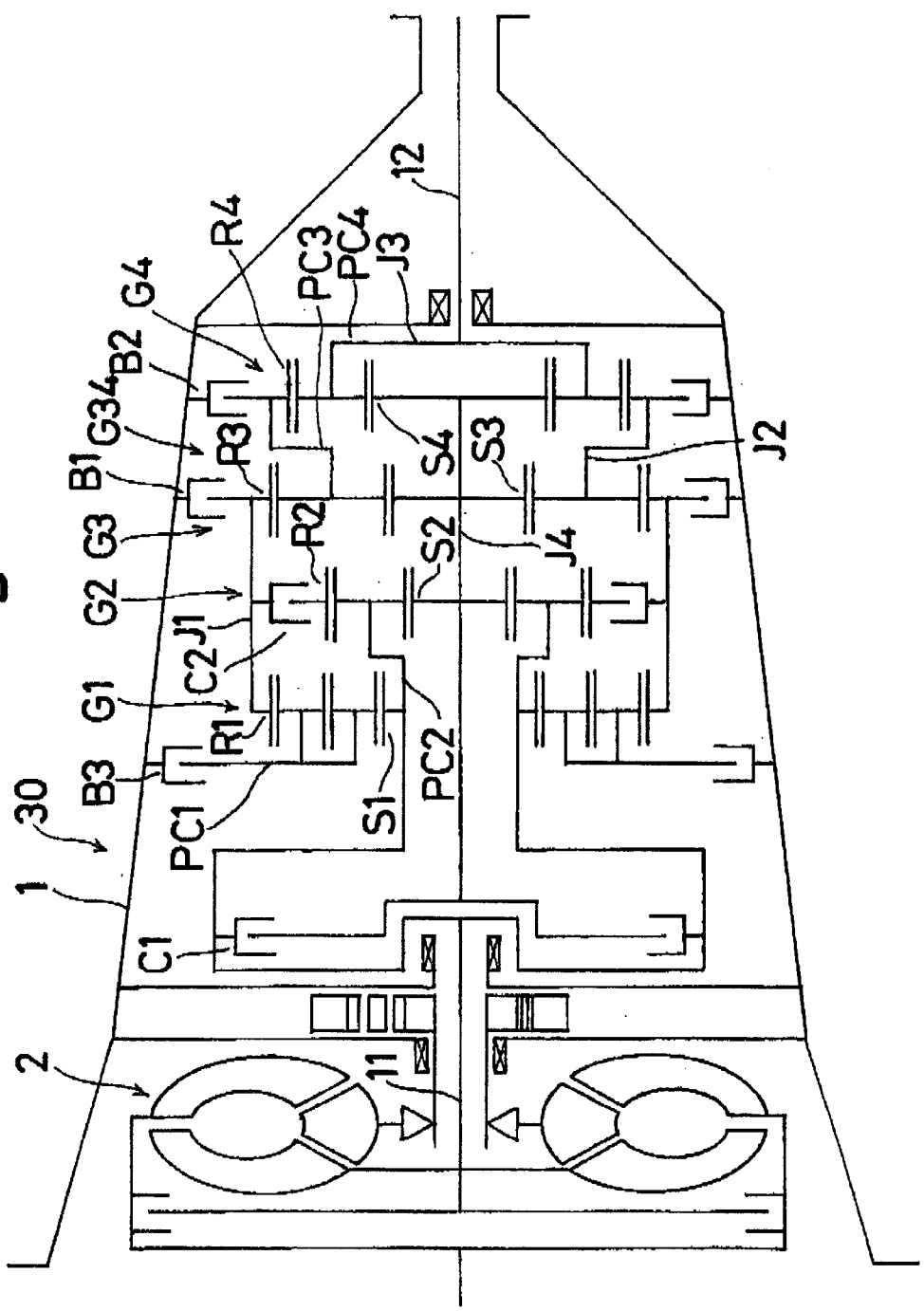
FIG. 3 is a schematic view of a third embodiment of the automatic transmission.

A third embodiment of this invention will be explained as follows. FIG. 3 shows a gear train of an automatic transmission 30 of the third embodiment.

The automatic transmission 30 of the third embodiment has differences compared to the automatic transmission 10 of the first embodiment as follows. In the third embodiment, the second clutch element C2 is capable of selectively interconnecting the first shaft element J1 and the ring gear R2 of the second planetary gear G2, and the input shaft 11 and the carrier PC2 of the second planetary gear G2 are normally interconnected. Since other structures of the third embodiment are identical to the first embodiment, further explanation thereof will be omitted and identical reference numerals to the first embodiment will be provided.

The combinations of the frictional engagement elements, and the gear ratios of the third embodiment are identical to the combinations of the frictional engagement element and the gear ratios of the first embodiment shown in Table 1. The ratios of the number of the teeth between the ring gears and the sun gears of each planetary gear, i.e., $\rho 1$, $\rho 2$, $\rho 3$, and $\rho 4$, of the third embodiment are identical to those of the first embodiment, hence further explanation thereof will be omitted. The operation of switching each frictional engagement element regarding the shift of the first speed, the second speed, the third speed and the reverse shift of the third embodiment is identical to the first embodiment. Accordingly, further explanation thereof will be omitted, and the operation of switching each frictional engagement element regarding the shift of the fourth speed, the fifth speed, and the sixth speed will be explained.

The Fourth Speed:

The torque of the input shaft 11 is transmitted to the fourth shaft element J4 via the first clutch element C1. The planetary gear unit G34 rotates as a unit by interconnecting the first shaft element J1 and the ring gear R2 of the second planetary gear G2 at the second clutch element C2, and the fourth speed is thereby formed.

The Fifth Speed:

The torque of the input shaft 11 is transmitted to the first shaft element J1 via the ring gear R2 of the second planetary gear G2 at the second clutch element C2. The output of the ring gear R1 which is related to an increased torque of the input shaft 11 is inputted into the first shaft element J1 by fixing the carrier PC1 of the first planetary gear G1 by the third brake element B3, which leads to an increasing speed of the third shaft element J3, and the fifth speed, which is an overdrive, is thereby formed.

The Sixth Speed:

The torque of the input shaft 11 is transmitted to the ring gear R2 of the second planetary gear G2 at the second clutch element C2. The third shaft element J3 is rotated at increasing speed by terminating the rotation of the first shaft element J1 by the first brake element B1, and the sixth speed, which is another overdrive, is thereby formed.

As mentioned above, by changing the combination of five frictional engagement elements, C1, C2, B1, B2 and B3, the transmission 30 obtains six forward speed shifts including four under-drives and two overdrives and one reverse shift.

The automatic transmission 30 of the third embodiment may be formed to connect the input shaft to the carrier PC1 of the first planetary gear G1 and to be capable of selectively fixing the sun gear S1 by the friction brake B3 as shown in the second embodiment.

A fourth embodiment of this invention will be explained as follows.

FIG. 4 shows a gear train of an automatic transmission 40 of the fourth embodiment.

The automatic transmission 40 of the fourth embodiment has the following differences compared to the first embodiment. The fourth shaft element J4 and the sun gear S2 of the second planetary gear G2 are selectively interconnectable by the second clutch element C2, and the input shaft 11 and the carrier PC2 of the second planetary gear G2 are normally connected. Since other structures of the fourth embodiment are identical to the first embodiment, further explanation thereof will be omitted and identical reference numerals are provided.

The combinations of the frictional engagement elements and the gear ratios of the fourth embodiment are identical to the combinations of the frictional engagement elements and the gear ratios of the first embodiment shown in Table 1. The ratios of the number of the teeth between the ring gears and the sun gears of each planetary gear, i.e., $\rho 1$, $\rho 2$, $\rho 3$ and $\rho 4$, of the fourth embodiment are identical to those of the first embodiment. Accordingly, further explanations thereof are omitted. Since the operations at switching each frictional engagement element of the first speed, the second speed, the third speed and the reverse shift of the fourth embodiment are identical to those of the first embodiment, further explanation thereof will be omitted and the operations at switching each frictional engagement element of the fourth speed, the fifth speed and the sixth speed will be explained.

The torque of the input shaft 11 is transmitted to the fourth shaft element J4, at the first clutch element C1. The planetary gear unit G34 rotates as a unit by interconnecting the fourth shaft element J4 and the sun gear S2 of the second planetary gear G2 at the second clutch element C2, and the fourth speed is thereby formed.

The torque of the input shaft 11 is transmitted to the first shaft element J1 via the ring gear R2 of the second planetary gear G2 at the second clutch element C2. The output of the ring gear R1, which is related to an increased torque of the input shaft 11, is inputted into the first shaft element J1 by fixing the carrier PC1 of the first planetary gear G1 by the third brake element B3, which leads to an increasing speed of the third shaft element J3, and the fifth speed, which is an overdrive, is thereby formed.

The torque of the input shaft 11 is transmitted to the ring gear R2 of the second planetary gear G2 at the second clutch element C2. The third shaft element J3 is rotated at increasing speed by terminating the rotation of the first shaft element J1 by the first brake element B1, and the sixth speed, which is another overdrive, is thereby formed.

As explained in the forgoing section, by chairing the combination of five frictional engagement elements of the transmission 40, C1, C2, B1, B2, and B3, the transmission 40 obtains six forward speed shifts including four under-drives and two overdrives and one reverse shift.

The automatic transmission 40 of the fourth embodiment may be formed to connect the input shaft 11 to the carrier PC1 of the first planetary gear G1 as shown in the second embodiment, and to be capable of selectively fixing the sun gear S1 at the friction brake B3.

According to the aforementioned first through fourth embodiments, since $\rho 1$ of the first planetary gear G1 is associated with the third speed and the fifth speed for forward and reverse shifts, the gear ratios of the first speed through the fourth forward speed are modified to the appropriate value by being provided with the double pinion structure for the first planetary gear G1. Providing the second planetary gear G2 between the first planetary gear G1 and the planetary gear unit G34, optimizes the gear ratios of the fifth speed and the sixth speed, and controls the pinion rpm at the sixth speed.

It is intended that the foregoing detailed description be regarded as illustrative rather than limiting and that it is understood that the following claims including all equivalents are intended to define the scope of the invention.

What is claimed is:

1. An automatic transmission comprising:
   an input shaft;
   an output shaft;
   a double pinion planetary gear in a first line, and including a sun gear, a ring gear, and a carrier, one of the sun gear and the carrier being connected to the input shaft;
   a single planetary gear in a second line and including a ring gear connectable to the ring gear of the double pinion planetary gear in the first line;
   a planetary gear unit provided in series and including:
      a single planetary gear in a third line, and including a carrier, a sun gear, and a ring gear connected to the ring gear of the double pinion planetary gear in the first line,
      a single planetary gear in a fourth line and including a carrier, a ring gear connected to the carrier of the single planetary gear in the third line, and a sun gear connected to the sun gear of the single planetary gear in the third line,
      a first shaft element connected to the ring gear of the single planetary gear in the third line,
      a second shaft element connected to the carrier of the single planetary gear in the third line,
      a third shaft element connected to the carrier of the single planetary gear in the fourth line and also connected to the output shaft, and
      a fourth shaft element connected to the sun gear of the single planetary gear in the third line;
   a first clutch element for selectively interconnecting the input shaft and the fourth shaft element;
   a second clutch element for selectively interconnecting the input shaft and the carrier of the single planetary gear in the second line;
   a first brake element for selectively fixing the first shaft element;
   a second brake element for selectively fixing the second shaft element; and
   a third brake element for selectively fixing one of the sun gear and the carrier of the double pinion planetary gear in the first line.

2. An automatic transmission comprising:
   an input shaft;
   an output shaft;
   a double pinion planetary gear in a first line and including a sun gear, a ring gear, and a carrier, one of the sun gear and the carrier being connected to the input shaft;

a single planetary gear in a second line and including a carrier connected to the input shaft, and a ring gear connectable to the ring gear of the double pinion planetary gear in the first line;

a planetary gear unit provided in series and including:
  a single planetary gear in a third line, and including a carrier, a sun gear, and a ring gear connected to the ring gear of the double pinion planetary gear in the first line,
  a single planetary gear in the fourth line, and including a carrier, a ring gear connected to the carrier of the single planetary gear in the third line, and a sun gear connected to the sun gear of the single planetary gear in the third line,
  a first shaft element connected to the ring gear of the single planetary gear of the third line,
  a second shaft element connected to the carrier of the single planetary gear in the third line,
  a third shaft element connected to the carrier of the single planetary gear in the fourth line and to the output shaft, and
  a fourth shaft element connected to the sun gear of the single planetary gear in the third line;

a first clutch element for selectively interconnecting the input shaft and the fourth shaft element;

a second clutch element for selectively interconnecting the first shaft element and the ring gear of the single planetary gear in the second line;

a first brake element for selectively fixing the first shaft element;

a second brake element for selectively fixing the second shaft element; and a third brake element for selectively fixing one of the sun gear and the carrier of the double pinion planetary gear in the first line.

3. An automatic transmission comprising:

an input shaft;

an output shaft;

a double pinion planetary gear in a first line and including a ring gear, a sun gear and a carrier, one of the sun gear and the carrier being connected to the input shaft;

a single planetary gear in a second line, and including a carrier connected to the input shaft, and a ring gear connected to the ring gear of the double pinion planetary gear in the first line;

a planetary gear unit provided in series and including:
  a single planetary gear in a third line, and including a carrier, a sun gear, and a ring gear connected to the ring gear of the double pinion planetary gear in the first line,
  a single planetary gear in a fourth line, and including a ring gear connected to a carrier of the single planetary gear in the third line, and a sun gear connected to the sun gear of the single planetary gear in the third line,
  a first shaft element connected to the ring gear of the single planetary gear in the third line,
  a second shaft element connected to the carrier of the single planetary gear in the third line,
  a third shaft element connected to a carrier of the single planetary gear in the fourth line and to the output shaft, and
  a fourth shaft element connected to the sun gear of the single planetary gear in the third line;

a first clutch element for selectively interconnecting the input shaft and the fourth shaft element;

a second clutch element for selectively interconnecting the sun gear of the single planetary gear in the second line and the fourth shaft element;

a first brake element for selectively fixing the first shaft element;

a second brake element for selectively fixing the second shaft element of the planetary gear unit; and a third brake element for selectively fixing one of the sun gear and the carrier of the double pinion planetary gear in the first line.

* * * * *